(12) United States Patent
Rapoport

(10) Patent No.: US 8,850,996 B2
(45) Date of Patent: Oct. 7, 2014

(54) STATIONARY SYSTEM FOR GAS TREATMENT OF TOP SOIL TO KILL PLANT PESTS AND METHODS THEREOF

(76) Inventor: Uri Rapoport, Moshav Ben Shemen (IL)

( * ) Notice: Subject to any disclaimer, the term of this patent is extended or adjusted under 35 U.S.C. 154(b) by 348 days.

(21) Appl. No.: 13/078,975

(22) Filed: Apr. 3, 2011

(65) Prior Publication Data

US 2011/0239918 A1      Oct. 6, 2011

Related U.S. Application Data

(60) Provisional application No. 61/320,738, filed on Apr. 4, 2010, provisional application No. 61/361,942, filed on Jul. 7, 2010.

(51) Int. Cl.
*A01C 23/00* (2006.01)
*A01C 23/04* (2006.01)
*A01M 17/00* (2006.01)

(52) U.S. Cl.
CPC ............ *A01C 23/042* (2013.01); *A01M 17/002* (2013.01)
USPC .............. 111/118; 111/129; 47/48.5; 47/57.5

(58) Field of Classification Search
USPC .......... 111/118, 119, 127, 129; 47/21.1, 48.5, 47/57.5, 57.7
See application file for complete search history.

(56) References Cited

U.S. PATENT DOCUMENTS

| | | | |
|---|---|---|---|
| 2,424,520 A * | 7/1947 | Tonkin | 504/101 |
| 5,624,635 A * | 4/1997 | Pryor | 422/32 |
| 7,343,867 B2 * | 3/2008 | Fraisse et al. | 111/118 |
| 2005/0279856 A1 * | 12/2005 | Nalbandian et al. | 239/76 |

* cited by examiner

*Primary Examiner* — Jamie L McGowan
(74) *Attorney, Agent, or Firm* — The Law Office of Michael E. Kondoudis

(57) ABSTRACT

A stationary system for gas treatment of top soil to kill plant pests including either underground or above ground piping netting for facilitating the flow of gas towards the roots of the plant, preferably via one or more injection nozzles. The system may be adapted to be in combination with water/fertilizers irrigation system, such that both (i) plant growth is promoted and (ii) plant pathogen kill by a compressible gas is provided.

5 Claims, 1 Drawing Sheet

STATIONARY SYSTEM FOR GAS TREATMENT OF TOP SOIL TO KILL PLANT PESTS AND METHODS THEREOF

CROSS-REFERENCE TO RELATED APPLICATIONS

This application claims the benefit of priority from U.S. Provisional Patent Application Nos. 61/320,738 and 61/361,942, filed Apr. 4, 2010 and Jul. 7, 2010, respectively.

FIELD OF THE INVENTION

The present invention generally pertains to a stationary system for gas treatment of top soil to kill plant pests and to methods thereof. More specifically, the current invention relates to a water/fertilizer irrigation system and gas flowing system for providing both maximum plant growth and pathogens treatment.

BACKGROUND OF THE INVENTION

U.S. Pat. No. 5,566,627 discloses a process for killing living organisms in top soil in a field, said process comprising: steps of generating a gas, said gas comprising unacidified ozone and a carrier gas; and injecting said gas into said top soil, from a naturally occurring surface of said field, said soil being suitable for plant growth purposes prior to said injecting, said soil comprising a plurality of living organisms, said injecting oxidizing at least a majority of said living organisms to weaken said living organisms such that said living organisms eventually die before their natural death.

U.S. Pat No. 7,427,177 discloses a method of treating a soil containing organic contaminants and microbials which are capable of biodegrading the organic contaminants in the presence of oxygen but are also susceptible to destruction by ozone comprising the steps of a) injecting ozone into the soil for a period of time known as the pulse duration, the pulse duration being sufficiently long to at least partially oxidize the contaminants but insufficient to completely destroy the microbials; b) interrupting the injection of the ozone into the soil and injecting oxygen or air into the soil for a period of time known as the gap duration so as to allow the regeneration of the microbials and the biodegradation of the organic contaminants; and repeating step a) at least one additional time wherein the organic contaminants are substantially oxidized and the ratio of ozone applied to contaminants oxidized is less than about 2 kg ozone/kg contaminants.

US Appl. No. 20050000154 discloses an apparatus and methods for enhanced plant and lawn growth using alkane injection. The technology is adapted to promote organism's growth. Hence for example, butane is used as a growth substrate, thereby significantly increasing the heterogeneous microbial community in soil. The enhanced microbial population will rapidly absorb and mineralize the degradable and available dissolved organic nutrients in the organic matter, thus producing an organic mix that is very resistant to further microbial or enzymatic attack. The butane may be injected intermittently to create feeding/starvation cycles within the microbial community. According to one embodiment of this invention, the plant growth-enhancing alkane additive comprises at least one insecticide. Nevertheless, a pesticide irrigating system is not discloses.

Thus, a stationary system for gas treatment of top soil to kill plant pests and methods thereof are still a long felt need.

SUMMARY OF THE INVENTION

Figures 1, 2:
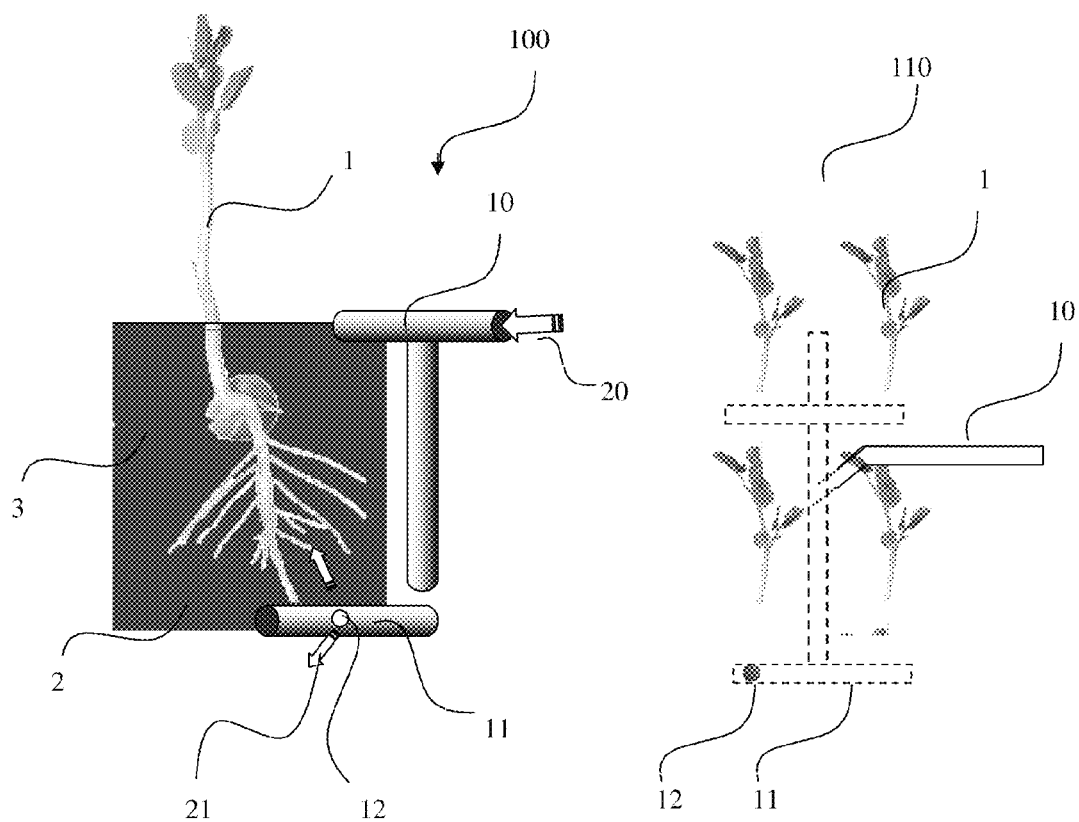
FIG. 1 illustrates in an out-of-scale manner (cross section view) system 100; and, FIG. 2 illustrates in an out-of-scale manner (top view) system 110.

It is one object of the invention to describe a system for gas treatment of top soil to kill plant pests; comprising underground piping netting for facilitating the flow of gas towards the roots of the plant, preferably via one or more injection nozzles; wherein said system is stationary.

It is another object of the invention to provide the system as defined above, which is especially adapted to be in combination with water/fertilizers irrigation system, such that both (i) plant growth is promoted and (ii) plant pathogen kill by means of compressible gas is provided.

It is still another object of the invention to provide a method for killing plant pathogens comprising step (steps) of (a) providing a stationary system for gas treatment of top soil to kill plant pathogens and (b) facilitating the flow of the said gas until said plant pathogens are killed.

It is another object of the invention to provide method for both increasing plant growth and killing plant pathogens comprising steps of providing a combination of water/fertilizers irrigation system and cost effective and durable stationary system for gas treatment of top soil to kill plant pests, located adjacent to the plant, or plant roots; and, providing fluids which enhance plant growth whilst facilitating the flow of gas in this system until growth of pathogens is reduced or until pathogens are been killed by means of said gas.

It is another object of the present invention to provide a system 100 for gas treatment of top soil to enhance growth of plants; comprising underground piping netting for facilitating the flow of gas towards the roots of the plant, preferably via one or more injection nozzles; wherein said system is stationary; further wherein said enhancement is obtained according to a predetermined growth protocol; said protocol comprising at least one step of killing plant pests; and at least one step of enhancing said plant growth.

It is another object of the present invention to provide the system as described above, wherein said enhance growth is obtained by facilitating the flow of materials selected from a group consisting of nutrients, fertilizers, salts, predetermined species of bacteria, growth cofactors, ethylene and other climacteric gases, ethylene-binding compounds, plant hormones, flowing particulate material, fine powders, nano-materials, anticorrosive agents, anticorrosive particulate Zinc powders, or any combinations thereof.

DETAILED DESCRIPTION OF THE PREFERRED EMBODIMENT OF THE INVENTION

The present invention presents a stationary system (100) useful for gas treatment of the top portion of agriculture soil to kill plant pathogens, microorganisms and otherwise plant pest. System 100 comprises irrigation-like piping net, having one or more piping and/or irrigation-like tubes, provided on the ground (10), one or more underground piping and/or injection-means (11) and a plurality of injection nozzles (12), all are in fluid communication with a gas supplying means, pumps, unidirectional flowing valves, controllers, and/or gas reservoirs. The flow of the gas is facilitated throughout system 100 in "on the ground", underground or combination thereof.

FIG. 1 illustrates in an out-of-scale manner (cross section view) one possible embodiment of the invention. Gas flow is facilitated from "on the ground" piping (20) towards injecting nozzles (12) via underground piping (11), and then to the top soil (3), namely towards the roots of the plant (2). When suitable biocidic gas is utilized, pathogens of the plant (1) are controlled.

It is in the scope of the invention, wherein the term 'gas' refers to compressible flowing fluid, selected in a non limiting manner from a group consisting inter alia $O_x$, such as oxygen or ozone, $NO_x$, such as $NO_2$ or $NO_3$, $SO_x$, such as $SO_2$ or $SO_3$, $N_x$, such as $N_2$, $CO_2$, alkenes, such as butane, propane, etc, halogens, such as $Cl_2$, $Br_2$, alkylated fluids, such as ethyelenes, methylenes, methyl bromide, or any combinations, derivates, derivatives, or mixtures thereof. It is also in the scope of the invention, wherein the term 'gas' refers to a fluid, such as liquid or flowable (particulate) solid matter, such as micro-granules, non-soluble particles, fertilizers in the solid state, or any gas-liquid, gas-solid and/or liquid-solids mixtures, emulsions etc.

Reference is now made to FIG. 2, which illustrates in an out-of-scale manner the same system (here 110), here in a top view. Continuous lines are referred to "on the ground" gas piping, and dashed lines referred to underground piping. Gas flow is facilitated from "on the ground" piping (10) to the roots of the plants (1) via underground piping (11) and injection nozzles (12).

It is in the scope of the invention wherein the gas as defined above flows into the system (100) in a continuous manner. It is also in the scope of the invention wherein the gas is facilitated in a protocol, said protocol is controlled mechanically or electrically by a feedbacked and/or programmable controller. It further is in the scope of the invention wherein the protocol provides the gas to the top soil in a series of pulses, or in any time-resolved manner. Hence, it is still in the scope of the invention wherein the gas concentration in the top soil is either constant of non-constant, e.g., altered in function of temperature, water activity or humidity, presence of plant pathogens, electrical conductivity, etc.

It is also in the scope of the invention wherein system (100) is a non-portable, stationary system, located adjacent to the plant, or plant roots. A combination of (i) water/fertilizers irrigation system and (ii) cost effective and durable stationary system for gas treatment of top soil to kill plant pests is thus hereby provided.

The present invention presents a method for killing plant pathogens. The method comprises a step of providing a non-portable, stationary system (100), located adjacent to the plant, or plant roots; and a step (steps) of facilitating the flow of gas in this system until growth of pathogens is reduced or until pathogens are killed by means of said gas.

The present invention also presents a method for both increasing plant growth and killing plant pathogens. The method comprises a step of providing a combination of water/fertilizers irrigation system and cost effective and durable stationary system for gas treatment of top soil to kill plant pests, located adjacent to the plant, or plant roots; and a step (steps) of both (i) providing fluids which enhance plant growth and (ii) facilitating the flow of gas in this system until growth of pathogens is reduced or until pathogens are been killed by means of said gas. The flow of fluids (i) and gas (ii) is controlled (e.g., in a programmable protocol for example) in a manner maximum plant growth is obtained, whilst maximum pathogen kill is provided.

It is within the scope of the present invention to provide a system 100 for gas treatment of top soil to enhance growth of plants; comprising underground piping netting for facilitating the flow of gas towards the roots of the plant, preferably via one or more injection nozzles; wherein said system is stationary; further wherein said enhancement is obtained according to a predetermined growth protocol; said protocol comprising at least one step of killing plant pests; and at least one step of enhancing said plant growth.

It is within the scope of the present invention to provide the system as described above, wherein said enhanced growth is obtained by facilitating the flow with materials selected from a group consisting of nutrients, fertilizers, salts, predetermined species of bacteria, growth cofactors, ethylene and other climacteric gases, ethylene-binding compounds, flowing particulate material, fine powders, nano-materials, anticorrosive agents, anticorrosive particulate Zinc powders, or any combinations thereof It is within the scope of the present invention to provide the system as described above, wherein said gas is purified.

Said purification can be obtained by physical means (e.g., filter, membranes et cetera), chemical means (e.g., salts), by biological means or any combination thereof It is within the scope of the present invention to provide the system as described above, wherein said system is beneath the plant's root or above the same.

It is within the scope of the present invention to provide the system as described above, wherein said system additionally comprising covering (e.g., nylon covering) means adapted to increase the efficacy of the growth enhancement.

EXAMPLES

The following are merely examples of compounds to be added so as to enhance plant growth, Rhizobacteria are root-colonizing bacteria that form a symbiotic relationship with many legumes.

Rhizobacteria (e.g., Acetobacter) and other nitrogen fixating bacteria can be added to the facilitated flow gas. Hence, enhance the growth of legume.

An example of anticorrosive agents are particulate Zinc powders.

The term "Plant hormones" or "phytohormones" refers hereinafter to chemicals that regulate plant growth. The main classes of plant hormones are Abscisic acid, Auxins, Cytokinins, Gibberellins and generally known hormones.

(a) Abscisic Acid (Also Known as ABA)

This class of Plant growth regulator, PGR, is composed of one chemical compound normally produced in the leaves of plants, originating from chloroplasts, especially when plants are under stress. In general, it acts as an inhibitory chemical compound that affects bud growth, seed and bud dormancy. It mediates changes within the apical meristem causing bud dormancy and the alteration of the last set of leaves into protective bud covers. Since it was found in freshly abscissed leaves, it was thought to play a role in the processes of natural leaf drop but further research has disproven this. In plant species from temperate parts of the world it plays a role in leaf and seed dormancy by inhibiting growth, but, as it is dissipated from seeds or buds, growth begins. In other plants, as ABA levels decrease, growth then commences as gibberellin levels increase. Without ABA, buds and seeds would start to grow during warm periods in winter and be killed when it froze again. Since ABA dissipates slowly from the tissues and its effects take time to be offset by other plant hormones, there is a delay in physiological pathways that provide some protection from premature growth. It accumulates within seeds during fruit maturation, preventing seed germination within the fruit, or seed germination before winter. Abscisic acid's effects are degraded within plant tissues during cold temperatures or by its removal by water washing in out of the tissues, releasing the seeds and buds from dormancy.

In plants under water stress, ABA plays a role in closing the stomata. Soon after plants are water-stressed and the roots are deficient in water, a signal moves up to the leaves, causing the formation of ABA precursors there, which then move to the roots. The roots then release ABA, which is translocated to the foliage through the vascular system and modulates the potassium and sodium uptake within the guard cells, which then lose turgidity, closing the stomata. ABA exists in all parts of the plant and its concentration within any tissue seems to mediate its effects and function as a hormone; its degradation, or more properly catabolism, within the plant affects metabolic reactions and cellular growth and production of other hormones. Plants start life as a seed with high ABA levels, just before the seed germinates ABA levels decrease; during germination and early growth of the seedling, ABA levels decrease even more. As plants begin to produce shoots with fully functional leaves—ABA levels begin to increase, slowing down cellular growth in more "mature" areas of the plant. Stress from water or predation affects ABA production and catabolism rates, mediating another cascade of effects that trigger specific responses from targeted cells. Scientists are still piecing together the complex interactions and effects of this and other phytohormones.

(b) Auxins

The auxin indoleacetic acid. Auxins are compounds that positively influence cell enlargement, bud formation and root initiation. They also promote the production of other hormones and in conjunction with cytokinis, they control the growth of stems, roots, and fruits, and convert stems into flowers.

They affect cell elongation by altering cell wall plasticity. Auxins decrease in light and increase where it is dark. They stimulate cambium cells to divide and in stems cause secondary xylem to differentiate. Auxins act to inhibit the growth of buds lower down the stems (apical dominance), and also to promote lateral and adventitious root development and growth. Leaf abscission is initiated by the growing point of a plant ceasing to produce auxins. Auxins in seeds regulate specific protein synthesis, as they develop within the flower after pollination, causing the flower to develop a fruit to contain the developing seeds. Auxins are toxic to plants in large concentrations; they are most toxic to dicots and less so to monocots. Because of this property, synthetic auxin herbicides including 2,4-D and 2,4,5-T have been developed and used for weed control. Auxins, especially 1-Naphthaleneacetic acid (NAA) and Indole-3-butyric acid (IBA), are also commonly applied to stimulate root growth when taking cuttings of plants. The most common auxin found in plants is indoleacetic acid or IAA. The correlation of auxins and cytokinins in the plants is a constant.

(c) Cytokinins

The cytokinin zeatin, or CKs are a group of chemicals that influence cell division and shoot formation. They also help delay senescence or the aging of tissues, are responsible for mediating auxin transport throughout the plant, and affect internodal length and leaf growth. They have a highly synergistic effect in concert with auxins and the ratios of these two groups of plant hormones affect most major growth periods during a plant's lifetime. Cytokinins counter the apical dominance induced by auxins; they in conjunction with ethylene promote abscission of leaves, flower parts and fruits.

(d) Ethylene

Ethylene gas is formed in the Yang Cycle from the breakdown of methionine, which is in all cells. Ethylene has very limited solubility in water and does not accumulate within the cell but diffuses out of the cell and escapes out of the plant. Its effectiveness as a plant hormone is dependent on its rate of production versus its rate of escaping into the atmosphere.

Ethylene is produced at a faster rate in rapidly growing and dividing cells, especially in darkness. New growth and newly germinated seedlings produce more ethylene than can escape the plant, which leads to elevated amounts of ethylene, inhibiting leaf expansion. As the new shoot is exposed to light, reactions by phytochrome in the plant's cells produce a signal for ethylene production to decrease, allowing leaf expansion. Ethylene affects cell growth and cell shape; when a growing shoot hits an obstacle while underground, ethylene production greatly increases, preventing cell elongation and causing the stem to swell. The resulting thicker stem can exert more pressure against the object impeding its path to the surface. If the shoot does not reach the surface and the ethylene stimulus becomes prolonged, it affects the stems natural geotropic response, which is to grow upright, allowing it to grow around an object. Studies seem to indicate that ethylene affects stem diameter and height: When stems of trees are subjected to wind, causing lateral stress, greater ethylene production occurs, resulting in thicker, more sturdy tree trunks and branches. Ethylene affects fruit-ripening: Normally, when the seeds are mature, ethylene production increases and builds-up within the fruit, resulting in a climacteric event just before seed dispersal. The nuclear protein Ethylene Insensitive2 (EIN2) is regulated by ethylene production, and, in turn, regulates other hormones including ABA and stress hormones.

(e) Gibberellins

Gibberellins or GAs, include a large range of chemicals that are produced naturally within plants and by fungi. Gibberellins are important in seed germination, affecting enzyme production that mobilizes food production used for growth of new cells. This is done by modulating chromosomal transcription. In grain (rice, wheat, corn, etc.) seeds, a layer of cells called the aleurone layer wraps around the endosperm tissue. Absoption of water by the seed causes production of GA. The GA is transported to the aleurone layer, which responds by producing enzymes that break down stored food reserves within the endosperm, which are utilized by the growing seedling. GAs produce bolting of rosette-forming plants, increasing internodal length. They promote flowering, cellular division, and in seeds growth after germination. Gibberellins also reverse the inhibition of shoot growth and dormancy induced by ABA.

(f) Other Known Hormones

Other identified plant growth regulators include:

a. Salicylic acid—activates genes in some plants that produce chemicals that aid in the defense against pathogenic invaders.

b. Jasmonates—are produced from fatty acids and seem to promote the production of defense proteins that are used to fend off invading organisms. They are believed to also have a role in seed germination, and affect the storage of protein in seeds, and seem to affect root growth.

c. Plant peptide hormones—encompasses all small secreted peptides that are involved in cell-to-cell signaling. These small peptide hormones play crucial roles in plant growth and development, including defense mechanisms, the control of cell division and expansion, and pollen self-incompatibility.

d. Polyamines—are strongly basic molecules with low molecular weight that have been found in all organisms studied thus far. They are essential for plant growth and development and affect the process of mitosis and meiosis.

e. Nitric oxide (NO)—serves as signal in hormonal and defense responses.

f. Strigolactones, implicated in the inhibition of shoot branching.

g. Karrikins, a group of plant growth regulators found in the smoke of burning plant material that have the ability to stimulate the germination of seeds.

While particular embodiments of this invention have been described above for purposes of illustration, it will be evident to those skilled in the art that numerous variations of the details of the present invention may be made without departing from the invention.

The invention claimed is:

1. A method of both enhancing plant growth and killing plant pathogens comprising:
   (a) providing a stationary system configured for providing fluids into an underground root area, said stationary system comprising a piping netting and a plurality of injection nozzles;
   (b) feeding plant growth enhancing fluids into the underground root area by means of said stationary system;
   (c) treating plant pests by a flow of a gaseous pesticide through said stationary system;
   wherein steps (b) and (c) are controlled by at least one of a feedback control and a programmable control and wherein steps (b) and (c) are performed concurrently such that an effect of said gaseous pesticides is facilitated by feeding said plant growth enhancing fluids into the underground root area until growth of pests is reduced or until said pests have been killed by means of said gaseous pesticide.

2. The method of claim 1, wherein said plant growth enhancing fluids comprise materials selected from the group consisting of nutrients, fertilizers, salts, predetermined species of bacteria, growth cofactors, ethylene and other climacteric gases, ethylene-binding compounds, plant hormones, flowing particulate material, fine powders, nano-materials, anticorrosive agents, and anticorrosive particulate Zinc powders, and a combination thereof.

3. A method of treating a top soil layer, comprising:
   providing a stationary system configured for providing fluids and gases into an underground root area in the top soil layer, the stationary system including
   (i) surface piping,
   (ii) underground piping in gaseous communication with the surface piping, and
   (iii) a plurality of injection nozzles connected to the underground piping;
   delivering plant growth enhancing fluids into the underground root area via the stationary system, from the surface piping to the injection nozzles;
   delivering a gaseous pesticide through into the underground root area via the stationary system, from the surface piping to the injection nozzles,
   wherein the delivering operations are controlled by at least one of a feedback control and a programmable control, and
   wherein at least a portion of each respective delivery operations is performed simultaneously.

4. The method of claim 3, wherein gas is a biocidic gas, and further comprising purifying the biocidic gas via at least one of filtering and a biologic means.

5. The method of claim 3, wherein the plant growth enhancing fluids include plant hormones, and wherein the stationary system includes a covering that covers a surface of the top soil layer.

* * * * *